June 24, 1952 R. E. HAYS 2,601,280
CONTROL VALVE
Filed May 14, 1946 2 SHEETS—SHEET 1

INVENTOR.
RAYMOND E. HAYS.
BY
ATTORNEY.

Patented June 24, 1952

2,601,280

UNITED STATES PATENT OFFICE 2,601,280

CONTROL VALVE

Raymond E. Hays, Philadelphia, Pa.

Application May 14, 1946, Serial No. 669,553

1 Claim. (Cl. 251—118)

(Granted under the act of March 3, 1883, as amended April 30, 1928; 370 O. G. 757)

This invention relates to new and useful improvements in valves, and more particularly, to fluid control valves. Specifically, the invention relates to a novel control valve especially adapted for use in the hydraulic systems of catapults of the type employed upon naval aircraft carriers.

The principal object of the present invention is to provide a novel valve to operate with a main control valve of a catapult engine, not shown, so as to hold and then release the pressure on the main control valve piston head so that said head and piston will stay closed and then instantly open to permit the flow of the pressure fluid through the main control valve and so actuate the catapult engine. When not operating, the main control valve of the catapult is screwed down on its seat by a conventional threaded stem and manually operated handwheel. To unscrew this stem in order to shoot the catapult would be too slow an operation. Therefore, just before shooting, the main control valve is held on its seat by hydraulic pressure only and the stem is screwed all the way back. Then, on signal to shoot, the present control valve releases the hydraulic pressure on the main control valve which instantly opens and permits the catapult engine to function.

Another object of the invention is to provide for normal leakage by the piston sealing rings of this valve back through a gravity return to the main fluid storage tank (not shown).

A further object of this invention is to provide a valve structure having the several features and characteristics set forth which ensures safe, positive and quick action by its rugged and durable construction and thereby minimizing breakdowns and repairs thereof.

Figure 1:
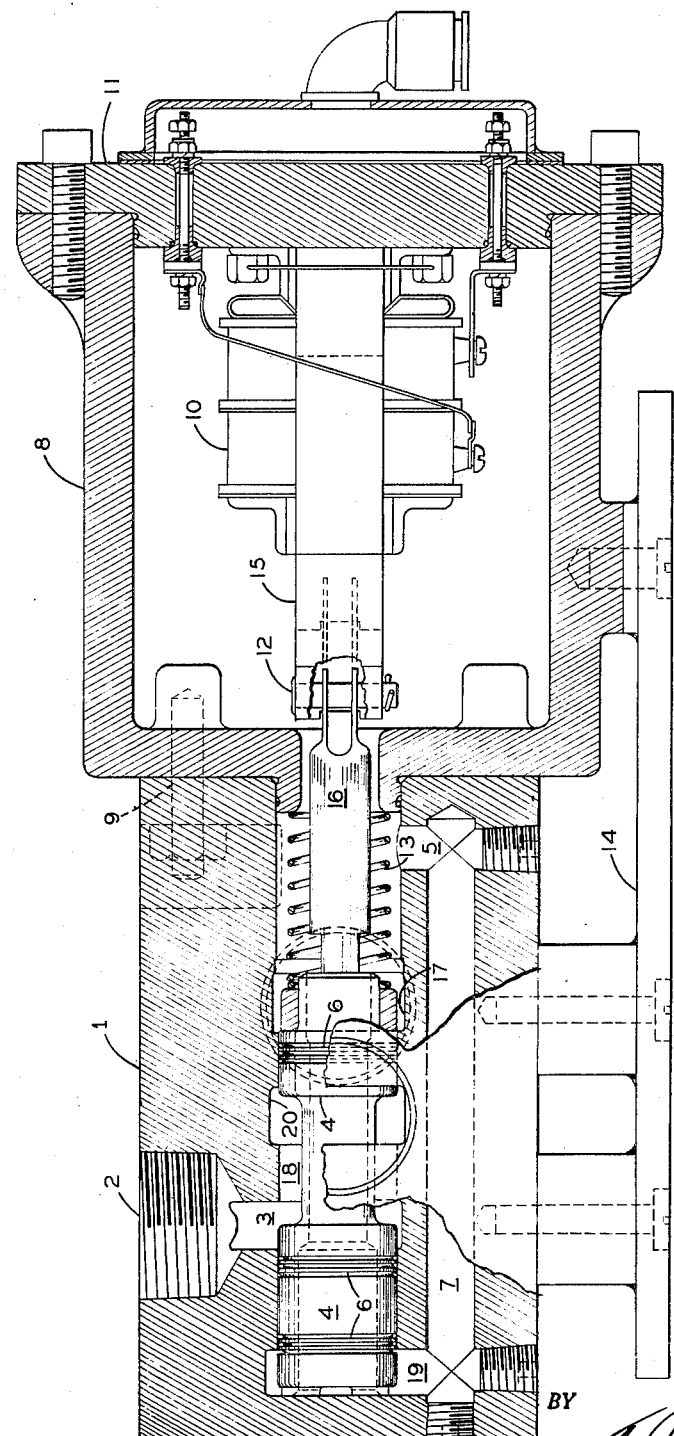
Figure 2:
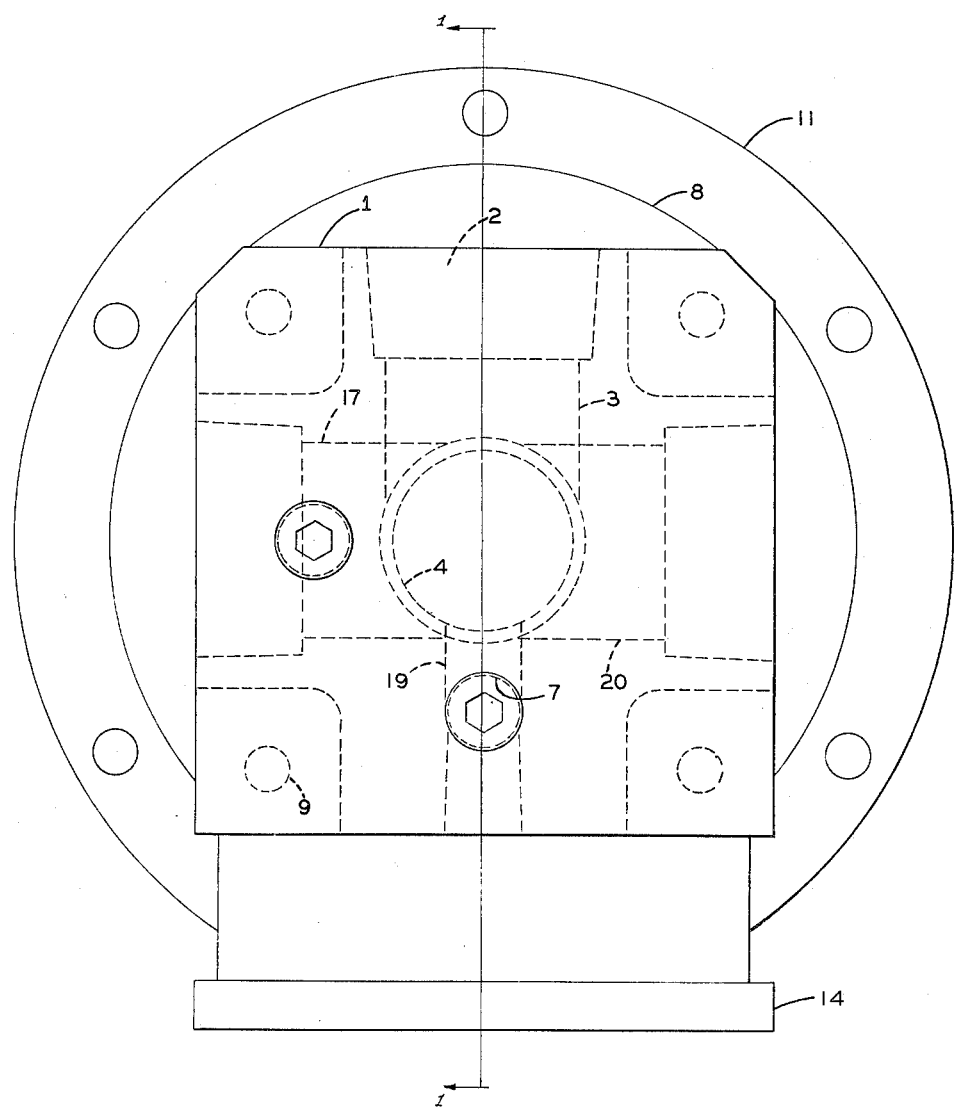

These and other objects of the invention, and the various features and details of the construction and operation thereof, are hereinafter more fully set forth and described with reference to the accompanying drawings in which Fig. 1 shows a longitudinal sectional view and Fig. 2 is an elevational end view from the piston end of the valve and in which like numbers refer to like parts.

Referring now to the drawings, Fig. 1 and Fig. 2, a valve made according to the present invention may comprise a body 1, having a port 2 which connects with an accumulator of a catapult engine, not shown, and having an orifice 3, connecting with valve chamber 18, in which piston 4 controls the fluid flow from orifice 3 to orifice 20 and then to orifice 17, which is a gravity return for the fluid to the fluid storage tank, not shown. This piston 4 is sealed by suitable packing rings 6 and a return orifice 19 is provided for the small amount of leakage from the high pressure fluid in the accumulator to the low pressure fluid in the gravity storage tank. 7 designates an annular duct connected to orifices 5 and 19 so that any small leakage past piston 4 will be drained back through orifice 17 to the fluid gravity tank, not shown. 8 illustrates a solenoid housing fastened to valve body 1 by suitable bolts 9. 10 is an electrically operated pull type solenoid supported on the cover 11 which is positioned in housing 8 in such a manner that it will be held in a centrally axial relation to shaft 16 to which it is connected by pin joint 12. 14 shows a bed plate to which is fastened and securely held in alignment both valve body 1 and solenoid 10 supported by housing 8. 13 is an actuating spring operating against the pull of the solenoid 10 to return the valve pistons to their closed position; when the solenoid 10 becomes deenergized the piston is returned to its closed position. The operation of valve is as follows:

When electric current is supplied to solenoid 10 the solenoid operates to draw armature 15 into its housing and transmits motion through pin joint 12 to shaft 16, which in turn is fastened to piston 4 moving said piston endwise in valve chamber 18 to close orifice 3 so that fluid pressure is released from the main control valve so that this valve will open instantly, allowing the fluid to flow under full accumulator pressure to the catapult engine.

The reverse cycle of piston 4 occurs when the solenoid is disconnected from the electrical circuit so that spring 13 becomes effective and exerts a force on piston 4, moving it back to its original position in chamber 18, thereby opening orifice 3, allowing the pressure to build up under the main control valve, which in turn closes and allows the pressure to build up in the accumulator for another cycle of operation.

From the foregoing it will be apparent that the present invention provides a novel valve structure that is operable effectively to control the safe, efficient and high speed operation of hydraulic catapults or other quick action high pressure devices.

While a particular embodiment of the present invention has been illustrated and described herein, it is not intended that the invention be limited to such disclosures, and changes and modifications may be made therein and thereto within the scope of the claims.

The invention described herein may be manufactured and used by or for the Government of the United States of America for governmental purposes without the payment of royalties thereon or therefor.

I claim:

A fluid control valve structure comprising: a housing having a longitudinal bore, a first lateral bore located adjacent one end of said longitudinal bore for connection to a high pressure source of fluid supply, a second lateral bore located adjacent the other end of said longitudinal bore for connection to a low pressure fluid reservoir and a third lateral bore located intermediate said first and second lateral bores for connection to a fluid operated valve means, all of said lateral bores communicating with said longitudinal bore whereby a first fluid passage is formed through said longitudinal bore between said first and third lateral bores and a second fluid passage is formed through said longitudinal bore between said second and third lateral bores; a valve element slidably located within said longitudinal bore and having a first piston portion for controlling the flow of fluid through said first fluid passage and a second piston portion for controlling the flow of fluid through said second fluid passage, spring means biasing said valve member to a normal position, said piston members being spaced from each other such a distance that when in the normal position said first fluid passage is open and said second fluid passage is closed so as to permit fluid to flow from said high pressure source to said fluid operated valve means, and actuation of the valve element out of said normal position results in opening of said first fluid passage and closing of said second fluid passage so as to permit the high pressure fluid in said fluid operated valve means to flow to said low pressure reservoir, and a second longitudinal bore coextensive with the first mentioned longitudinal bore and in continuous communication with each end thereof when the valve element is in both the normal and actuated positions.

RAYMOND E. HAYS.

REFERENCES CITED

The following references are of record in the file of this patent:

UNITED STATES PATENTS

| Number | Name | Date |
|---|---|---|
| Re. 12,710 | Kramer | Oct. 29, 1907 |
| 1,281,543 | Farmer | Oct. 15, 1918 |
| 1,820,653 | Ernst | Aug. 25, 1931 |
| 1,937,077 | West | Nov. 28, 1933 |
| 2,078,006 | Lockwood | Apr. 20, 1937 |
| 2,145,977 | Foster | Feb. 7, 1939 |
| 2,238,768 | Berglund | Apr. 15, 1941 |
| 2,289,567 | Berglund | July 14, 1942 |
| 2,374,593 | Ernst | Apr. 24, 1945 |
| 2,515,029 | Almond et al. | July 11, 1950 |